United States Patent
Shinoda et al.

(10) Patent No.: US 8,257,537 B2
(45) Date of Patent: Sep. 4, 2012

(54) MANUFACTURING DEVICE AND MANUFACTURING METHOD OF LAMINATE

(75) Inventors: Tomoyuki Shinoda, Nagoya (JP); Satoru Nagaoka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 457 days.

(21) Appl. No.: 12/524,971

(22) PCT Filed: Jan. 24, 2008

(86) PCT No.: PCT/JP2008/050934
§ 371 (c)(1),
(2), (4) Date: Jul. 29, 2009

(87) PCT Pub. No.: WO2008/096605
PCT Pub. Date: Aug. 14, 2008

(65) Prior Publication Data
US 2010/0084090 A1 Apr. 8, 2010

(30) Foreign Application Priority Data
Feb. 5, 2007 (JP) .................................. 2007-025174

(51) Int. Cl.
*B32B 37/00* (2006.01)
(52) U.S. Cl. ...................... 156/228; 156/581; 156/583.1
(58) Field of Classification Search ................. 156/228, 156/580, 581, 583.1
See application file for complete search history.

(56) References Cited

U.S. PATENT DOCUMENTS
4,200,272 A * 4/1980 Godding .................... 269/26

FOREIGN PATENT DOCUMENTS
| JP | 8-300395 A | 11/1996 |
| JP | 2004-114586 A | 4/2004 |
| JP | 2005-262818 A | 9/2005 |
| JP | 2006-103305 A | 4/2006 |
| JP | 2006-142819 A | 6/2006 |
| JP | 2006-256202 A | 9/2006 |

OTHER PUBLICATIONS

International Search Report dated Feb. 26, 2008, application No. PCT/JP2008/050934.

* cited by examiner

*Primary Examiner* — James Sells
(74) *Attorney, Agent, or Firm* — RatnerPrestia (57) ABSTRACT

A manufacturing device used when manufacturing composite material through the RTM method and the vacuum assisted RTM method and provides a manufacturing device which is capable of manufacturing a laminate excellent in the handling property and formability continuously by making the manufacturing device of a laminate to be comprised of an adhesion device for partially adhering and integrating inter-layers of a laminate precursor in which two or more reinforcing fiber base materials having a resin material on a surface are laminated by the resin material to obtain a laminate, the adhesion device including a pressing tool and a plate tool arranged facing each other, the pressing tool including a pressing plate and a plurality of pressing pins, at least one of the pressing tool and the plate tool having a raising and lowering function, and at least one of the pressing tool and the plate tool having a heating function.

13 Claims, 4 Drawing Sheets

MANUFACTURING DEVICE AND MANUFACTURING METHOD OF LAMINATE

This application is a U.S. National Phase Application of PCT International Application No. PCT/JP2008/050934, filed Jan. 24, 2008, which claims priority to Japanese Patent Application No. 2007-025174, filed Feb. 5, 2007, the contents of both applications being incorporated by reference herein in their entirety.

FIELD OF THE INVENTION

The present invention relates to a manufacturing device and a manufacturing method of a laminate made of reinforcing fiber base material used when manufacturing a fiber-reinforced plastic molded by infusing and impregnating matrix resin to the laminate made of reinforcing fiber base material not impregnated with matrix resin in such as RTM (Resin Transfer Molding) method or RFI (Resin Film Infusion) method.

BACKGROUND OF THE INVENTION

The FRP such as CFRP and GFRP using carbon fiber, glass fiber, or aramid fiber as a reinforcing fiber is light and has high durability, and thus is an ideal material for various types of configuring members configuring automobiles, airplanes, and the like.

A typical method for molding the CFRP and the GFRP is an autoclave molding method of pressurizing and heating a laminate, in which a prepreg sheet made of reinforcing fiber and highly toughened epoxy resin is laminated, in an autoclave (pressure vessel) to cure the same.

However, the prepreg sheet generally has a problem in that molding of a complex three-dimensional shape is difficult. Furthermore, as it takes too much material cost and molding time, and the cost becomes high, the application cannot be extended in the present circumstances in the autoclave molding using the conventional prepreg.

In recent years, the Resin Transfer Molding (hereinafter referred to as "resin transfer" or "RTM") method, vacuum-assisted resin transfer molding method of infusing and impregnating matrix resin by using vacuum pressure, and the like that are inexpensive and can reduce the molding time than the autoclave molding method using the conventional prepreg are given attention as a method of obtaining the CFRP.

Such molding methods are those comprising arranging that in which a dry reinforcing fiber base material not impregnated with matrix resin is laminated in plurals in a molding die, impregnating the matrix resin in the reinforcing fiber base material by infusing low viscosity liquid matrix resin thereto, and thereafter curing the matrix resin by heating in an oven and the like to mold a composite material. Since the dry base material is used in the RTM method, the laminate including the reinforcing fiber base material can be formed in accordance with the complex three-dimensional shape.

In forming the reinforcing fiber base material through such method, a great amount of time is required if forming by laminating the reinforcing fiber base material one at a time, and thus it is required for the forming to arrange the laminate, in which the reinforcing fiber base material is laminated based on a predetermined stacking sequence in advance, in a forming tool. The inter-layers of reinforcing fiber base materials configuring the laminate need to be integrated each other in order to arrange the laminate in the forming tool. If not integrated, the stacking angle and the stacking position of the reinforcing fiber base material may shift in time of movement such as when arranging the laminate in the forming tool even if laminated with the stacking angle and the stacking position controlled in time of lamination. In particular, in the uni-directional reinforcing fiber base material in which the reinforcing fibers are aligned in uni-direction, it is very important to control the stacking angle as the stacking angle greatly influences the characteristics of the fiber-reinforced plastic.

The lamination number of reinforcing fiber base material is sometimes changed in the same member depending on the optimum design of the fiber-reinforced plastic structural parts. For instance, the wing of the airplane and the like have great lamination number and are thick at the root of the wing that bears the main load, but have small lamination number and are thin at the tip of the wing. Reducing the lamination number is generally called the ply drop. In the structural part provided with the ply drop, the position where the reinforcing fiber base material should have ply drops is configured, and thus the stacking position of the reinforcing fiber base material in the laminate is also a very important matter.

Since the prepreg is impregnated with matrix resin, the prepregs are adhered and integrated using the tackiness of the matrix resin. Thus, there is no fear that the stacking angle and the stacking position will shift in the laminate of the prepreg when carried around. However, since the inter-layers of the prepreg are adhered and integrated over the entire surface of the prepreg, wrinkles and the like may produce when forming to a complex shape as described above.

In the laminate of the dry reinforcing fiber base material not impregnated with the matrix resin, resin material such as polyether amine and acrylonitrile-butadiene rubber is arranged on the surface of the reinforcing fiber base material so that the inter-layers of the reinforcing fiber base material can be adhered and integrated through the resin material, as described in patent document 1 and the like. However, patent document 1 does not disclose the adhesion mode of the inter-layers in the laminate of the reinforcing fiber base material; if the inter-layers are adhered and integrated over the entire reinforcing fiber base material in the laminate of the dry reinforcing fiber base material, formation to a complex shape is difficult similar to the laminate of prepreg, and the advantages of formability obtained as the matrix resin is not impregnated cannot be exhibited.

Patent document 2 discloses using the reinforcing fiber base material in which the adhesive resin, in which glass transition temperature Tg is between 0 and 95° C., is attached over the entire surface of the base material in dot-form, linear form, or discontinuous linear form on at least one side of a reinforcing fiber sheet, and adhering and integrating the reinforcing fiber base material with the adhesive resin. In other words, patent document 2 describes that the adhesion condition of the laminate is that the temperature is within a range of Tg to (Tg+50° C.), the pressure is lower than or equal to 0.1 MPa, and the time is within three hours, and that when adhered in such condition, the adhesive resin appropriately melts over the entire reinforcing fiber base material and the variation by places of the adhesive strength of the reinforcing fiber base materials is small. However, as the inter-layers are adhered and integrated over the entire reinforcing fiber base material even in the technique described in this document, the formation to the complex shape is also difficult similar to the laminate of prepreg, and the advantages of formability obtained as the matrix resin is not impregnated cannot be exhibited.

Patent document 3 describes a method of arranging a press tool having a pressing portion capable of heat sealing in a lattice-form attached to a press machine on the laminate of the reinforcing fiber base materials, and heating and pressurizing for a constant time the laminate under a heating atmosphere of 80° C. to join the inter-layers of the reinforcing fiber base materials. However, this document does not describe the method of controlling the pressure of each pressing portion. Thus, when adhesion of the large laminate such as one used in a large member including airplane members, it is very difficult to uniform the pressure of all pressing positions and maintain such pressure for a constant time.

In addition, patent document 3 describes a mode in which the stacking sequence (lamination number and the like) of the reinforcing fiber base material is the same over the entire laminate and the thickness of the laminate is substantially constant, but the stacking sequence of the reinforcing fiber base material may differ depending on the site even in one member, and the thickness of the laminate may differ depending on the site. If the thickness of the laminate differs depending on the site, when pressed using the press tool in which a plurality of pressing pins are completely fixed to one plate as described in FIG. 5 of patent document 3, the pressing pin impinges the thick site of the laminate while the pressing pin is less likely to impinge the thin site of the laminate, whereby pressurization with an even pressure over the entire laminate is difficult; as a result, even adhesion cannot be realized. If the pressure is too high, the adhesion of the inter-layers at such site becomes strong, and drawbacks such as generation of wrinkles become a concern in time of forming. If the pressure is too low, the adhesion of the inter-layers at such site becomes weak and the inter-layers delaminate in handling before forming, whereby drawbacks such as degrading of handling property become a concern. Therefore, the press tool having a mechanism in which each pressing pin can independently control the pressure is desired.

In other words, although a technique of improving the handling property, and adhering and integrating the inter-layers to express satisfactory formability when collectively forming to a predetermined shape, and a manufacturing device for manufacturing such laminate are desired in the laminate of the dry reinforcing fiber base material not impregnated with matrix resin, they are not achieved in the present circumstances.

Patent document 1: Japanese Laid-Open Patent Publication No. 8-300395
Patent document 2: Japanese Laid-Open Patent Publication No. 2004-114586
Patent document 3: Japanese Laid-Open Patent Publication No. 2006-103305

SUMMARY OF THE INVENTION

The present invention provides a manufacturing device which is capable of manufacturing a laminate excellent in the handling property and formability by partially adhering and integrating inter-layers of two or more laminated reinforcing fiber base materials where the laminate of reinforcing fiber base material is suitably used when manufacturing composite material through the RTM method and the vacuum assisted RTM method.

Embodiments of the present invention include the following:

(1) A manufacturing device of a laminate including an adhesion device for partially adhering and integrating inter-layers of a laminate precursor in which two or more reinforcing fiber base materials having a resin material on a surface are laminated by the resin material to obtain a laminate, the adhesion device including a pressing tool and a plate tool arranged facing each other, the pressing tool including a pressing plate and a plurality of pressing pins, at least one of the pressing tool and the plate tool having a raising and lowering function, and at least one of the pressing tool and the plate tool having a heating function.

(2) The manufacturing device of the laminate according to (1), wherein a distance between a plate tool side distal end of the pressing pin and the pressing plate is variable.

(3) The manufacturing device of the laminate according to (1) or (2), wherein the pressing pin is attached to the pressing plate by way of a spring and is movable by compressing the spring in a longitudinal direction of the pressing pin.

(4) The manufacturing device of the laminate according to (2), wherein a distance between the plate tool side distal end of the pressing pin and the pressing plate is variable by hydrostatic pressure.

(5) The manufacturing device of the laminate according to any one of (1) to (4), wherein the pressing pin has a circular shape at the plate tool side distal end.

(6) The manufacturing device of the laminate according to any one of (1) to (5), wherein a tube for heating medium flow path is installed on at least one of the pressing tool and the plate tool having the heating function.

(7) The manufacturing device of the laminate according to any one of (1) to (6), wherein an insulating material is attached to a position of sandwiching at least one of the pressing tool and the plate tool having the heating function with the laminate precursor.

(8) The manufacturing device of the laminate according to any one of (1) to (7), further including a movement device for moving the laminate, the movement device including a means for conveying the laminate out from the adhesion device by moving the laminate parallel in a longitudinal direction of the laminate while being sandwiched and gripped from above and below in a thickness direction of the laminate, and supplying a laminate precursor different from the laminate precursor used for the conveyed laminate to the adhesion device.

(9) The manufacturing device of the laminate according to (8), wherein the adhesion device and the movement device are driven by an air cylinder.

(10) A manufacturing method of a laminate for partially adhering and integrating inter-layers of a laminate precursor in which two or more reinforcing fiber base materials having a resin material on a surface are laminated by the resin material through at least following steps (a) and (b).

(a) An arrangement step of arranging the laminate precursor between a plate tool and a pressing tool, where the pressing tool includes a pressing plate and a plurality of pressing pins and is configured such that a distance between a plate tool side distal end of the pressing pin and the pressing plate is variable;

(b) A pressurizing and heating step of lowering the pressing tool and/or raising the plate tool, sandwiching the laminate precursor between the pressing tool and the plate tool, partially pressurizing the laminate precursor with the pressing pins, and heating at least the pressurized location of the laminate precursor.

(11) The manufacturing method of the laminate according to (10), wherein in the step (a), the laminate precursor is arranged between the plate tool and the pressing tool in which the pressing pin is attached to the pressing plate by way of a spring, and in the step (b), a length of compressing the spring and the pressure of pressurizing the laminate precursor with the pressing pin are controlled by lowering the pressing tool and/or raising the plate tool.

(12) The manufacturing method of the laminate according to (10), wherein in the step (a), the laminate precursor is arranged between the plate tool and the pressing tool in which a distance between a plate tool side distal end of the pressing pin and the pressing plate is variable by hydrostatic pressure, and in the step (b), the hydrostatic pressure and a pressure of pressurizing the laminate precursor with the pressing pin are controlled by lowering the pressing tool and/or raising the plate tool.

According to an embodiment of the present invention, the laminate precursor in which two or more reinforcing fiber base materials having a resin material on a surface not impregnated with matrix resin can be more evenly pressurized at the desired pressure, and thus the obtained laminate exhibits satisfactory handling property, and also exhibits satisfactory formability when being formed to a predetermined shape. Hence, the fiber-reinforced plastic with complex shape can be manufactured while preventing generation of wrinkles by infusing and impregnating the matrix resin to the laminate and forming. According to an embodiment of present invention, the laminate can be automatically and continuously manufactured, and thus reduction in time and lowering in cost can be achieved.

DESCRIPTION OF SYMBOLS

1: reinforcing fiber base material
2: reinforcing fiber
3: warp as auxiliary thread
4: weft as auxiliary thread
5: resin material
6: manufacturing device of laminate
7: adhesion device
8: movement device
9: laminate precursor
10: pressing tool
11: plate tool
12: air cylinder
13: raising and lowering direction of pressing tool
14: heating medium flow path tube
15: pressing pin
16: pressing plate
17: upper clamp tool
18: lower clamp tool
19: laminate
20: air cylinder
21: raising and lowering direction of upper clamp tool
22: air cylinder
23: movement direction of lower clamp tool
24: cut off
25: through-hole
26: spring
27: pressing pin distal end
28: flange of pressing pin
29a: upper pressing plate
29b: lower pressing plate
30: step

DETAILED DESCRIPTION OF THE INVENTION

The preferred embodiment of a manufacturing device of a laminate of the present invention where the laminate is comprised of reinforcing fiber base materials will be described below with reference to the drawings. The present invention is not limited to the embodiments illustrated in the drawings.

Figure 1:
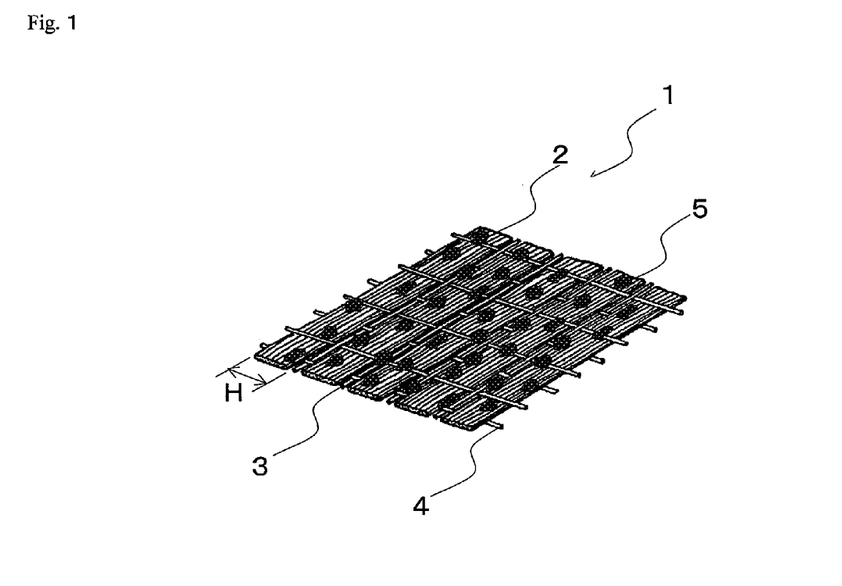
FIG. 1 shows a schematic view of a reinforcing fiber base material having a resin material on a surface used in an embodiment of the present invention.

First, FIG. 1 shows one example of a reinforcing fiber base material having resin material on the surface used in the present invention. A reinforcing fiber base material 1 shown in FIG. 1 has a resin material 5 adhered and integrated to the surface of the base material comprised of reinforcing fibers 2, and warps 3 and wefts 4 as auxiliary threads.

Figure 2:
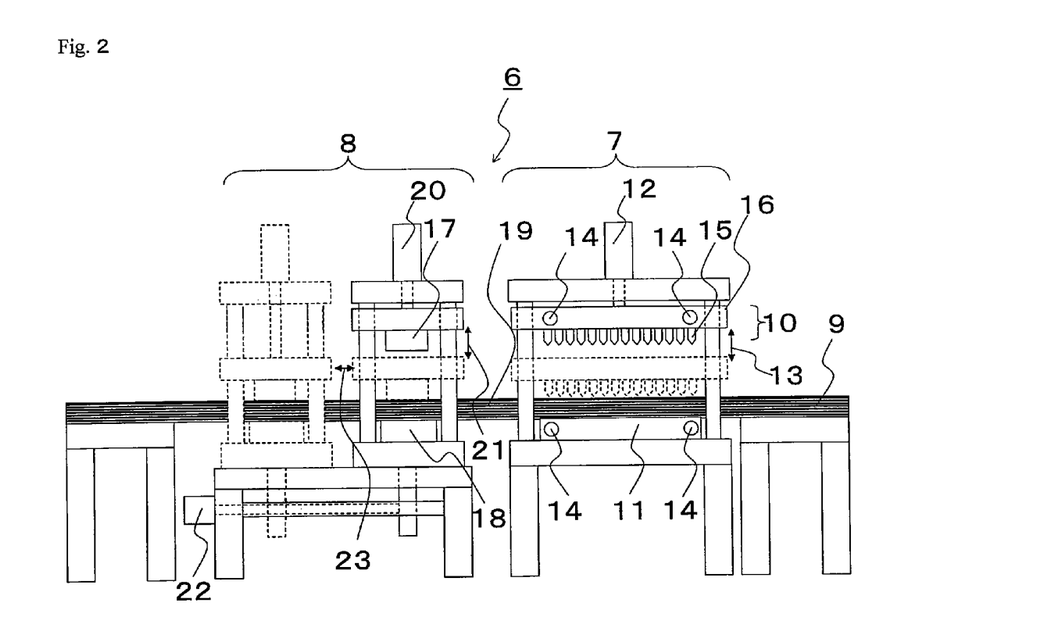
FIG. 2 shows one example of a manufacturing device of a laminate of an embodiment of the present invention.

FIG. 2 shows one example of a manufacturing device of a laminate. A manufacturing device 6 of the laminate shown in FIG. 2 is comprised of an adhesion device 7 for partially adhering and integrating inter-layers of a laminate precursor 9 in which two or more reinforcing fiber base materials having resin material on the surface are laminated by the resin material, a movement device 8 for moving the laminate, and the like.

The adhesion device 7 is mainly comprised of a pressing tool 10 and a plate tool 11 arranged facing each other, wherein the pressing tool 10 and the plate tool 11 are configured to be arranged on the top and bottom of the laminate precursor 9 before partial adhesion. The adhesion device 7 is installed with an air cylinder 12, and has a function of raising and lowering the pressing tool 10 in a direction of an arrow 13. The pressing tool 10 and the plate tool 11 are also arranged with a heating medium flow path tube 14, and have a function of heating the pressing tool 10 and the plate tool 11 by flowing a heating medium heated by a mold temperature controller (not shown) through the heating medium flow path tube 14. Furthermore, the pressing tool 10 is comprised of a pressing plate 16 and a plurality of pressing pins 15, wherein the plurality of pressing pins 15 are configured to be orderly arrayed in the longitudinal direction and the width direction of the laminate precursor 9. In FIG. 2, a state in which the plurality of pressing pins 15 are orderly arrayed in the longitudinal direction of the laminate is shown.

Instead of the function of raising and lowering the pressing tool 10 in the direction of the arrow 13, a function of raising and lowering the plate tool 11 in the same direction may be provided, or a function of raising and lowering both the pressing tool 10 and the plate tool 11 may be provided. Moreover, instead of heating both the pressing tool 10 and the plate tool 11, a function of heating only one of them may be provided.

Figure 3:
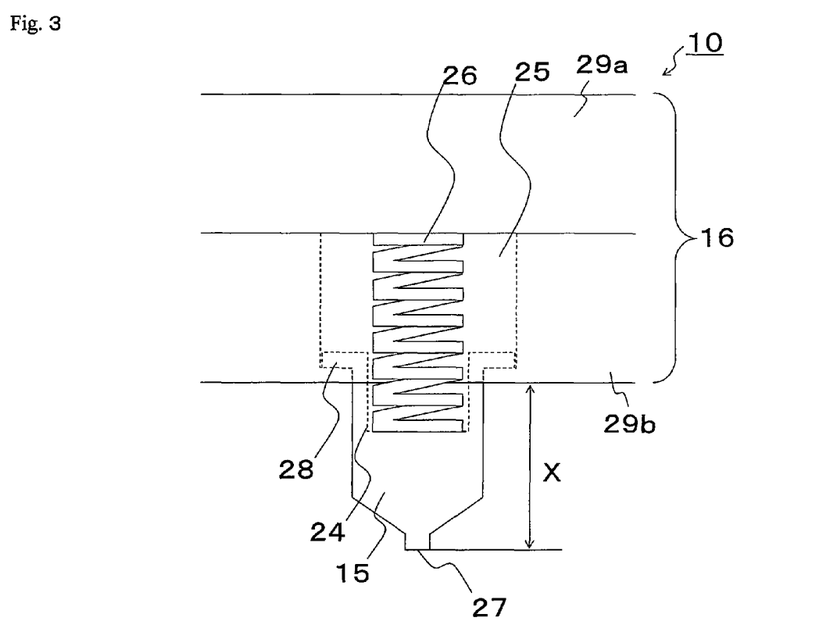
FIG. 3 shows one example of an attachment configuration to a pressing plate of a pressing pin used in an embodiment of the manufacturing device of the laminate of the present invention.

In an embodiment of the manufacturing device of the laminate, a distance X between a plate tool side distal end 27 of the pressing pin 15 and the pressing plate 16 is preferably variable, as shown in FIG. 3. Specifically, the pressing pin 15 is preferably attached to the pressing plate 16 by way of a spring 26 having a spring constant k.

In the embodiment shown in FIG. 3, the pressing plate 16 is comprised of an upper pressing plate 29a and a lower pressing plate 29b, and a through-hole 25 is formed in the lower pressing plate 29b. A cut off 24 is formed in each pressing pin 15, and a spring 26 is arranged in each cut off 24. The pressing pin 15 arranged with the spring is fitted into the through-hole 25 of the pressing plate 16, and such spring 26 is compressed in the longitudinal direction of the pressing pin by being pushed by the upper pressing plate 29a. In this case, each pressing pin 15 is preferably attached with the spring 26 compressed by a constant length $\Delta L_0$ from a natural length. When the pressing pin 15 is attached with the spring 26 in a compressed state, the spring 26 presses down the pressing pin 15 at a load of $\Delta F = k \times \Delta L_0$, and thus the pressurization can start at the moment the pressing pin 15 contacts the laminate precursor 9 when lowering the pressing tool 10 and pressurizing the laminate precursor 9 with the pressing pin 15.

The spring constant k is preferably greater than or equal to 0.05 N/mm and smaller than or equal to 50 N/mm. If the spring constant k is smaller than 0.05 N/mm, the pressing pin may not heat the laminate precursor 9 with sufficient pressure, whereas if the spring constant k is greater than 50 N/mm, the outer diameter of the spring becomes too large and the number of pressing pins that can be installed in a constant area of the pressing plate may be limited to a small number.

In the embodiment shown in FIG. 3, the distance between the plate tool side distal end of the pressing pin 15 and the pressing plate 16 may be variable by compressed air or hydrostatic pressure of water, oil and the like instead of the spring 26.

Figure 6:
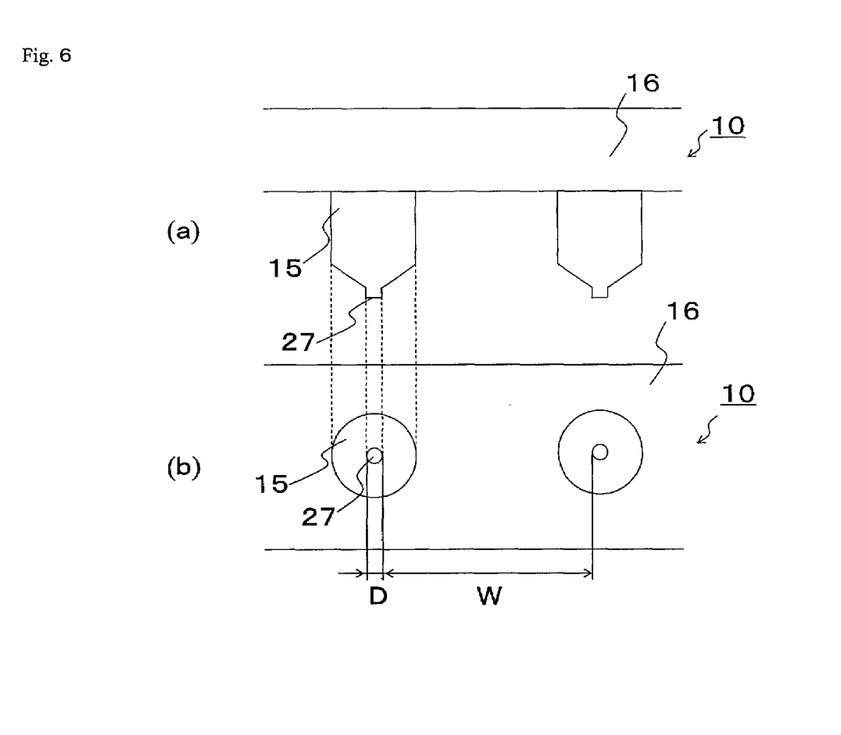
FIG. 6 shows one example of a pressing tool used in an embodiment of the manufacturing device of the laminate of the present invention.

The pressing pin 15 used in an embodiment of the present invention preferably has a maximum length of the pressing pin distal end face for pressurizing the laminate precursor 9 of greater than or equal to 1 mm and smaller than or equal to 20 mm. The maximum length of the pressing pin distal end face is the maximum length at the contacting surface to the laminate precursor, and is a diameter D in the case of the pressing tool 10 shown in FIG. 6. In FIG. 6, (a) is a side view and (b) is a plane view. If the maximum length of the pressing pin distal end face is smaller than 1 mm, the adhesion area of the inter-layers of the laminate becomes too small, the adhesion of the inter-layers is easily delaminated, and the handling property of the laminate precursor may be impaired, whereas if the maximum length of the pressing pin distal end face is greater than 20 mm, the adhesion area of the inter-layers of the laminate becomes too large and the formability of the laminate may be impaired. The maximum length of the pressing pin distal end face is more preferably smaller than or equal to a width H of a reinforcing fiber bundle configuring the reinforcing fiber base material (see FIG. 1). The formability of the laminate improves by having the maximum length of the pressing pin distal end face in the above range.

Therefore, the spring constant of the spring used in an embodiment of the manufacturing device of the laminate of the present invention is preferably selected by $k = PS/\Delta L$ based on the pressure P for pressurizing the laminate by the pressing pin, the contacting area S to the laminate precursor of the pressing pin determined from the length of the pressing pin distal end face, and the contraction amount $\Delta L$ from the natural length of the spring that contracts when pressurizing the laminate precursor with the pressing pin.

As shown in FIG. 6, the distance W between the distal ends of the adjacent pressing pins (i.e., between two points the distance between the distal ends of the adjacent pressing pins becomes a minimum) is preferably greater than or equal to a width H (mm) of one reinforcing fiber bundle comprising the reinforcing fiber base material and smaller than or equal to 5 H (mm). When the pressing pin is arranged such that the above distance between the distal ends is obtained, a range in which the adjacent reinforcing fiber bundles are not be adhered and are not be integrated can be provided in the reinforcing fiber base material comprising the laminate, and thus satisfactory formability can be exhibited without impairing the formability of the reinforcing fiber base material itself and the handling property can be enhanced by the partial adhesion even with the laminate in which the inter-layers of the laminate precursor are partially adhered and integrated.

More specifically, the distance W between the distal ends of the adjacent pressing pins is preferably greater than or equal to 3 mm and smaller than or equal to 100 mm. If smaller than 3 mm, the interval of partial adhesion becomes too narrow, and the adhesion density becomes too high, and thus the formability of the laminate is sometimes impaired as a result. If greater than 100 mm, the interval of partial adhesion becomes too wide, the adhesion density becomes low, and the adhesion of the laminate becomes insufficient, and thus the handing property may be degraded.

Furthermore, the shape of the contacting surface to the laminate precursor of the pressing pin distal end 27 for pressurizing the laminate precursor is preferably a circle as shown in FIG. 6. The pressing pin distal end 27 contacts and pressurizes the reinforcing fiber base material comprising the laminate. Thus, the shape of the pressing pin distal end is preferably circular since the reinforcing fiber is less likely to be damaged as sharp edges do not exist in the plane direction of the laminate. If the cross-sectional shape of the pressing pin distal end 27 is a shape having sharp edges in the plane direction of the laminate such as square or triangle, the reinforcing fiber of the surface of the laminate pressurized with such sharp edge tends to be damaged and the quality of the laminate may be degraded. When referring to "circular", this means a set of points at equal distance from a certain fixed point, and furthermore, "circular" referred to herein includes a case where the difference between the maximum value and the minimum value of a segment passing through the barycenter of a figure surrounded by a set and connecting two points of the points on the set is smaller than or equal to 10% of the minimum value (in this case, diameter D is defined as an average value of the maximum value and the minimum value).

In the present invention, the method of heating the pressing tool and the plate tool is not particularly limited. A method of heating by installing an electrically heating wire in the pressing tool and the plate tool and flowing current and the like may be used instead of the method of heating by arranging a tube for the heating medium flow path in the pressing tool and the plate tool as shown in FIG. 2 and flowing the heating medium such as warm water and heated oil by using the mold temperature controller and the like in the tube. Among them, heating by heating medium is preferable as temperature control and maintenance are relatively easy. Thus, the pressing tool and the plate tool are preferably heated by arranging the tube for heating medium flow path in the pressing tool and the plate tool, attaching a heating medium heating device such as mold temperature controller in the tube, and flowing the heating medium.

The pressing tool and the plate tool are preferably attached with an insulating material. If the radiation of heat from the pressing tool and the plate tool is strong, control of the heating by the pressing pin becomes difficult, but radiation of heat of the pressing tool and the plate tool can be suppressed by attaching the insulating material to the pressing tool and the plate tool, and partial adhesion of the laminate precursor can be stably carried out. Specifically, the insulating material is preferably arranged at a position of sandwiching the pressing tool and the plate tool having a heating function with the laminate precursor.

The movement device 8 is comprised of an upper clamp tool 17 and a lower clamp tool 18. The upper clamp tool 17 is further installed with an air cylinder 20, and a function for raising and lowering the upper clamp tool 17 in a direction of an arrow 21 is provided; the movement device 8 is further installed with an air cylinder 22, and a function for parallel moving the upper clamp tool 17 and the lower clamp tool 18 in a direction of an arrow 23 is provided. According to such configuration, a laminate 19 is arranged between the upper clamp tool 17 and the lower clamp tool 18, wherein the upper clamp tool 17 and the lower clamp tool 18 sandwich and grip the laminate from the top and bottom in the thickness direction, parallel move in the longitudinal direction of the laminate while gripping, and convey out the integrated laminate 19 and supply the portion continued to the laminate 19 but not adhered, that is, another laminate precursor to the adhesion device.

The drive means of the adhesion device and the movement device is not particularly limited, but should be able to easily and continuously drive in terms of installation without using power by using the air cylinder using compressed air. In particular, when driving the movement device with the air cylinder, the force of sandwiching the partially adhered laminate with the upper clamp tool and the lower clamp tool can be easily controlled by the pressure of the compressed air, and thus it is preferable.

In an embodiment of the present invention, instead of arranging a means for moving the laminate, for example, the movement device 8, a means for moving the adhesion device 7 in the longitudinal direction and/or the width direction of the laminate precursor 9 may be arranged. According to such configuration, the laminate can be partially adhered over the entire surface thereof, similar to the case of arranging the movement means of the laminate.

Subsequently, a method of partially adhering and integrating the inter-layers of the laminate precursor in which two or more reinforcing fiber base materials having resin material on the surface are laminated, and manufacturing the laminate with the above-described device will be described.

In manufacturing the laminate with the above device, the heating medium heated to a predetermined temperature is flowed to the heating medium flow path tube 14 to heat the pressing tool 10 and the plate tool 11 to a predetermined temperature, and the laminate precursor 9 before partial adhesion is arranged on the plate tool 11 in such state.

At this point, the pressing tool 10 is positioned on the upper side of the arrow 13.

After arranging the laminate precursor 19, the air cylinder 12 is caused to act the compressed air, the pressing tool 10 is lowered, the laminate precursor 9 is sandwiched by the pressing tool 10 and the plate tool 11, the laminate precursor 9 is heated and pressurized for a predetermined constant time with the pressing pin 15, and the inter-layers of the laminate precursor of the pressurized area are adhered and integrated by the resin material.

Figure 4:
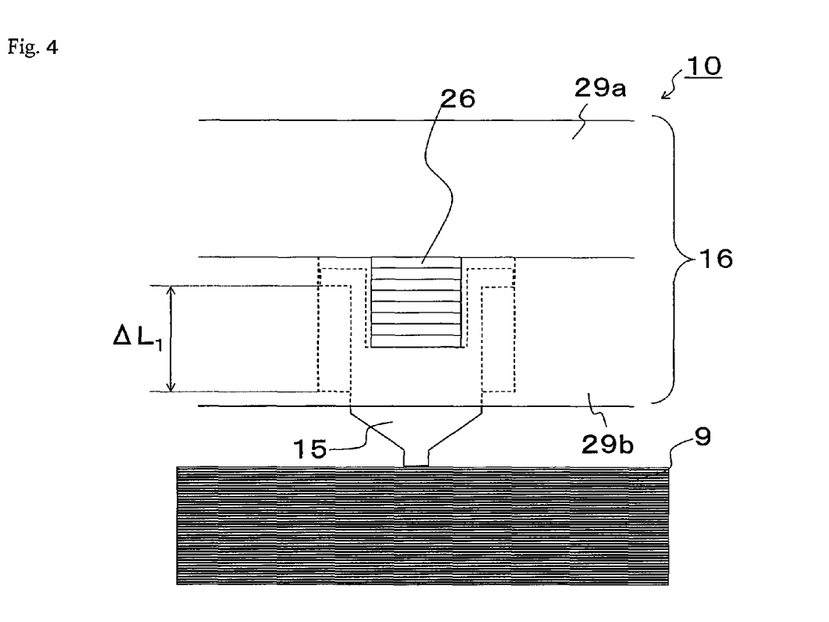
FIG. 4 shows one example of a state in which the pressuring pin used in an embodiment of the manufacturing device of the laminate of the present invention pressurizes a laminate precursor.

A state when a device in which the pressing pin 15 is attached to the pressing plate 16 by way of the spring 26 having a spring constant k is used and the pressing tool 10 is lowered so that one pressing pin 15 pressurizes the laminate precursor 9 is shown in FIG. 4. In FIG. 4, a state in which the spring 26 is further compressed by length $\Delta L_1$ than the state in which each pressing pin 15 is attached to the pressing plate 16, and is pressurizing the laminate precursor 9 is shown. In this case, since the spring 26 is already compressed by $\Delta L_0$ in a state of being attached to the pressing plate, the spring 26 will be compressed by $(\Delta L_0 + \Delta L_1)$ from the natural length. Thus, the spring 26 pushes the pressing pin 15 at the load $F = k \times (\Delta L_0 + \Delta L_1)$ to pressurize the laminate precursor 9 at the same load.

In this case, the pressure for pressurizing the laminate precursor 9 is a value P obtained by dividing the load F at which the pressing pin 15 is pushed by the spring 26 with the cross-sectional area S of the pressing pin distal end 27 for directly pressurizing the laminate precursor 9 of the pressing pin 15 shown in FIG. 3, that is, $P = F/S$. Thus, the pressure for pressurizing the laminate precursor 9 by the pressing pin 15 can be adjusted by controlling the distance of lowering the pressing tool 10 and controlling the compression length of the spring 26.

Figure 5:
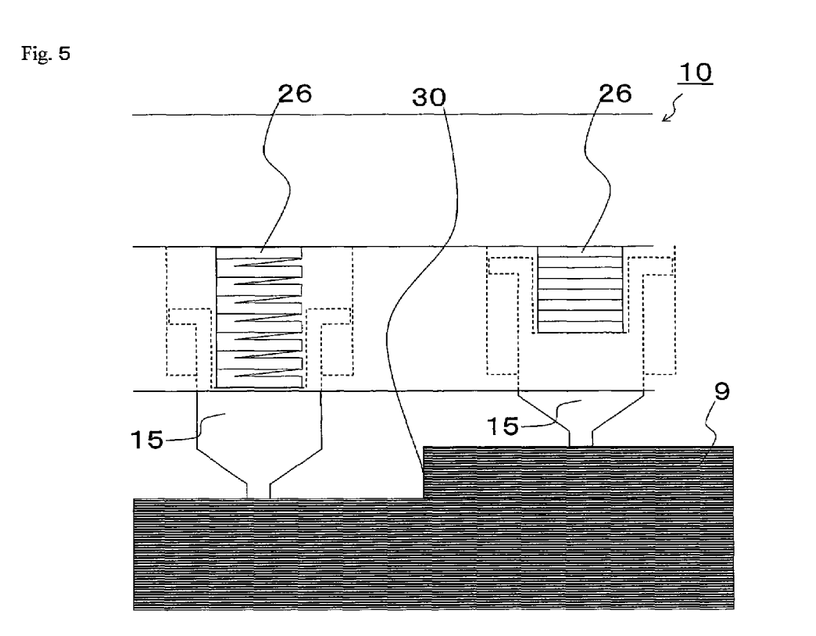
FIG. 5 shows one example of a state in which the pressuring pin used in an embodiment of the manufacturing device of the laminate of the present invention pressurizes the laminate precursor having thickness varying.

Furthermore, as shown in FIG. 5, even when adhering the laminate precursor 9 having thickness varying (step 30) due to change in the lamination number, the compression length of the spring 26 is individually adjusted; Thus although the pressure of pressurization by the pressing pin 15 differs by the difference in the compression length $\Delta L$ of the spring between the thick area and the thin area of the laminate precursor 9, pressurization can be carried out while preventing tilt of the pressing pin.

Therefore, the pressing pin can be prevented from tilting with respect to the laminate precursor not only in the laminate precursor of the same thickness but also in the laminate precursor having thickness varying by attaching the plurality of pressing pins 15 separately to the pressing plate 16 by way of the spring 26, whereby partial adhesion can be satisfactorily carried out. Similar effects can be obtained even if the distance between the plate tool side distal end of the pressing pin and the pressing plate is variable by the compressed air or the hydrostatic pressure of water, oil, and the like in place of the spring.

After partially adhering the inter-layers of the laminate precursor 9 by the adhesion device 7, the pressing tool 10 is raised by acting compressed air to the air cylinder 12; then, the air cylinder 20 is caused to act the compressed air to lower the upper clamp tool 17, to sandwiched the partially adhered laminate 19 by the upper clamp tool 17 and the lower clamp tool 18, the air cylinder 22 is caused to act the compressed air to move the clamp tools in the direction of the arrow 23 while sandwiching the laminate 19, and the laminate 19 in which the inter-layers of the laminate precursor 9 are partially adhered in the adhesion device 7 is pulled out and at the same time a laminate precursor different from the laminate precursor used for the laminate that has been pulled out is conveyed into the adhesion device 7. In this case, the inter-layers of the laminate precursor 9 can be partially adhered in a continuous manner by repeating the above operation. Here, "laminate precursor different from the laminate precursor used for the conveyed laminate" includes a new laminate precursor different from the laminate precursor used for the laminate 19 that has been conveyed out, as well as a laminate precursor including a portion that constitutes one part of the laminate precursor used for the conveyed laminate 19 but having the majority not yet adhered.

EXAMPLE

Embodiments of the present invention will be described in more detail below using examples and comparative examples.

Example 1

<Preparation of Laminate Precursor Before Partial Adhesion>

With carbon fiber yarn (reinforcing fiber bundle) in which the number of filaments is 24,000, the width is 5.4 mm, the tensile strength is 5.8 GPa, and the tensile modulus is 290 GPa as the warp, and using a covering filament covered (coated) with nylon 66 filament thread of 17 dtex in which refining process is performed on the glass fiber thread attached with coupling agent of 22.5 dtex as the auxiliary thread of the warp and the nylon 66 filament thread of 17 dtex performed with refining process as the auxiliary thread of the weft, the unidirectional non-crimp carbon fiber fabric having the carbon fiber areal weight of 190 g/cm$^2$ was manufactured.

The particles having an average particle diameter of 120 μm and containing thermoplastic resin having a glass transition temperature of 70° C. were evenly dispersed on both sides of the uni-directional non-crimp carbon fiber fabric as adhesive resin with 13 g/m$^2$ per one side, and heated to 200° C. to be attached to the surface of the fabric, thereby fabricating the carbon fiber base material.

The carbon fiber base material was cut to obtain the reinforcing fiber base materials in which the carbon fiber yarn is aligned in the 45° direction, 0° direction, −45° direction, and 90° direction with respect to the longitudinal direction of the base material, and such reinforcing fiber base materials were sequentially laminated such that the alignment direction of the carbon fiber yarn was 45°/0°/−45°/90°/−45°/0°/45° to thereby prepare the laminate precursor. The carbon fiber base material was cut such that the size of the laminate had a width of 0.55 m and a length of 6 m.

<Laminate Manufacturing Device>

As shown in FIG. 2, the laminate manufacturing device was comprised of the adhesion device 7 and the movement device 8.

Figure 7:
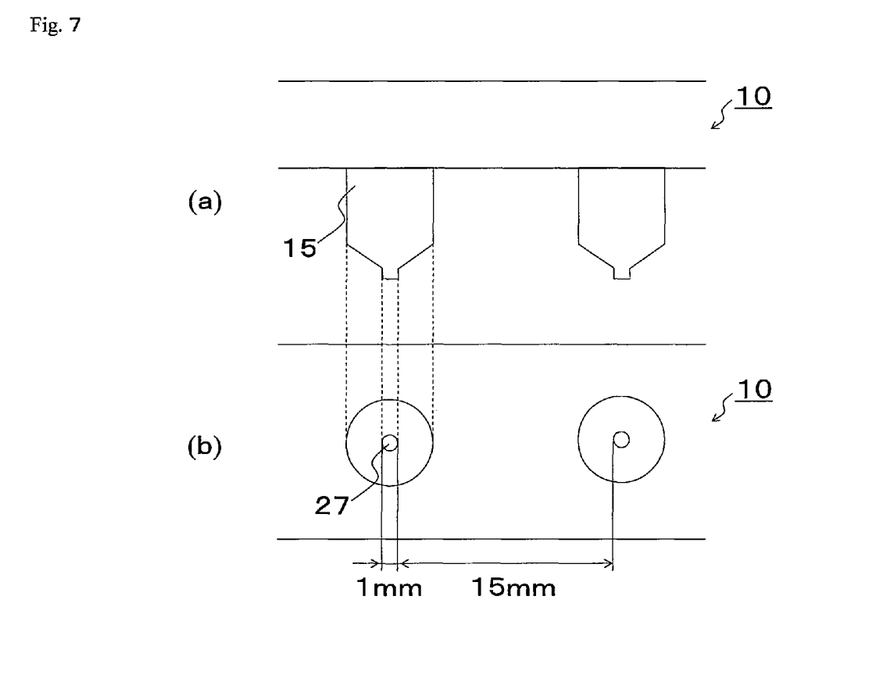
FIG. 7 shows one example of a pressing tool used in an embodiment of the manufacturing device of the laminate of the present invention.

As shown in FIG. 7, the pressing tool had the pressing pin 15 made of aluminum, in which the shape of the contacting surface to the laminate precursor of the pressing pin distal end 27 is a circle having a diameter of 1 mm, arrayed in the longitudinal direction and the width direction of the pressing tool such that the distance between the adjacent pressing pin distal ends was 15 mm. As shown in FIG. 3, the pressing pin 15 was attached to the pressing plate 16 made of aluminum by way of the spring of spring constant k=0.1 N/mm and such that the spring was compressed by 5 mm. The maximum stroke ($\Delta L_1$ of FIG. 4) of the pressing pin was 3 mm. The pressing plate 16 had the width of 600 mm and the length of 500 mm, and a total of 1320 pressing pins 15 were attached.

The pressing tool 10 and the plate tool 11 were attached with the heating medium flow path tube, so that the pressing pin 15 and the plate tool could be heated to a maximum of 100° C. by flowing the heated warm water through the heating medium flow path tube with the warm water temperature controller.

Furthermore, the pressing tool 10 was attached with the air cylinder 12, so that the pressing tool 10 could be raised up and lowered down. The lowering distance of the pressing tool 10 was adjusted to a distance where the pressing pin distal end of each pressing pin 15 can pressurize the pressurizing area of the laminate precursor at 0.1 N/mm$^2$.

The movement device 8 was also attached with two air cylinders 20, 22, so that the clamp tool could be raised and lowered, and parallel moved. The parallel movement distance of the movement device 8 was 500 mm.

The compressed air of the air cylinder was input by an electromagnetic valve, and the drive of the adhesion device 7 and the movement device 8 was controlled by an open-and-close program of the electromagnetic valve.

The open-and-close program of the electromagnetic valve for sending the compressed air to the air cylinders 12, 20, 22 such that the pressing tool 10, the upper clamp tool 17 and the lower clamp tool 18 repeat the following (1) to (7) was then created.

(1) Activate the air cylinder 12 and lower the pressing tool 10.

(2) Hold the pressing tool 10 for five minutes in the lowered state.

(3) Activate the air cylinder 12 and raise the pressing tool 10.

(4) Activate the air cylinder 22 with the upper clamp tool 17 in the raised state, and move the movement device 8 to the right side (solid line part) of the arrow 23 in FIG. 2.

(5) Activate the air cylinder 20 and lower the upper clamp tool 17.

(6) Activate the air cylinder 22 with the upper clamp tool 17 in the lowered state, and move the movement device 8 to the left side (broken line part) of the arrow 23 in FIG. 2.

(7) Activate the air cylinder 20 and raise the clamp tool 17.

<Partial Adhesion of Laminate Precursor by Laminate Manufacturing Device>

The inter-layers of the laminate precursor were partially adhered in the following manner using the laminate manufacturing device described above.

First, the warm water having temperature of 73° C. was flowed to the heating medium flow path tube attached to the pressing tool and the plate tool by the warm temperature controller, and it was confirmed that all the pressing pins were heated to within the range of 70±5° C.

The laminate precursor was arranged in the adhesion device 7 of the manufacturing device 6 shown in FIG. 2 such that 500 mm from the end in the longitudinal direction of the laminate precursor could be partially adhered. The laminate precursor is provided with a sandwiching margin, so that the upper clamp tool 17 and the lower clamp tool 18 of the movement device 8 could sandwich the sandwiching margin with the laminate precursor arranged in the adhesion device 7.

The open-and-close program of the electromagnetic valve of the air cylinders 12, 20, 22 was then activated. In other words, the laminate precursor was heated and pressurized for five minutes by 1320 pressing pins heated at 70±5° C. to partially adhere the inter-layers of the laminate precursor. After the partial adhesion was completed, the laminate over the partially adhered length of 500 mm was conveyed out from the adhesion tool and laminate precursor over the length of 500 mm to be partially adhered from now on was conveyed into the adhesion device with the upper clamp tool and the lower clamp tool, and partial adhesion by the adhesion tool was repeatedly performed. As a result, the partial adhesion of the inter-layers was completed over the entire laminate precursor of a width of 0.55 m and a length of 6 m in about one hour after the laminate precursor was installed in the manufacturing device.

<Forming Test of Partially Adhered Laminate>

The partially adhered laminate was cut to a shape of a length of 0.5 m and a width of 0.5 m to prepare a forming test laminate. The forming test laminate was then arranged on a forming die in which the curvature radius has a contour of 600 mm in two direction, the entire forming test laminate was covered from above with a silicon rubber sheet having a thickness of 2.5 mm, the ends of the silicon rubber sheet was sealed with a sealant material, and the interior of the sealed space was vacuumed to apply atmospheric pressure to the forming test laminate, thereby forming to the forming die.

It was then installed in the oven with the interior of the space sealed with the silicon rubber sheet vacuumed and the atmospheric pressure applied on the formed forming test laminate, and the formed forming test laminate was heated and held at a temperature of 80° C. for two hours by the oven to manufacture a formed body (called pre-form).

The pre-form had the inter-layers of the laminate adhered over the entire surface by the adhesive resin through the pressurization of the atmospheric pressure and the heating by the oven. As a result of examining the outer appearance of the pre-form, it was confirmed that wrinkles and the like were not generated, and the partially adhered laminate exhibits satisfactory formability.

Example 2

Figure 8:
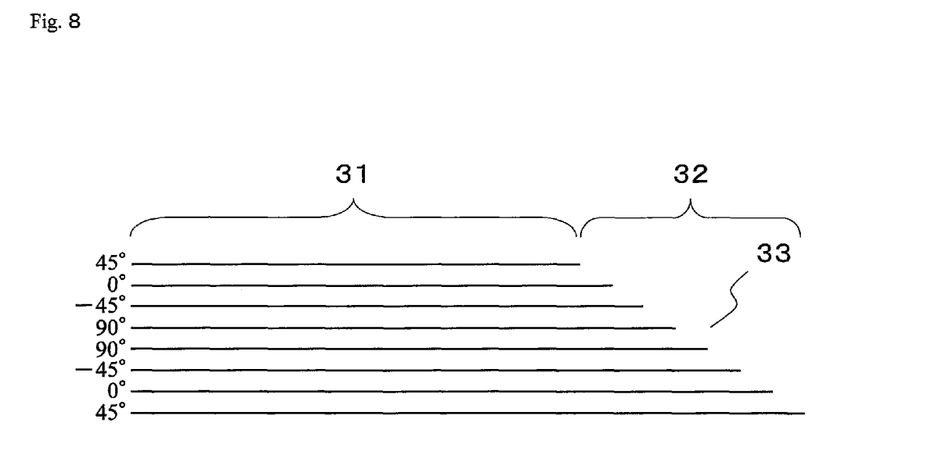
FIG. 8 shows a configuration view of a laminate precursor in example 2.

The carbon fiber base material same as example 1 was cut to obtain the reinforcing fiber base material in which the carbon fiber yarn is aligned in the 45° direction, 0° direction, −45° direction, and 90° direction with respect to the longitudinal direction of the base material, and such reinforcing fiber base materials were sequentially laminated such that the alignment direction of the carbon fiber yarn was 45°/0°/−45°/90°/90°/−45°/0°/45° to thereby prepare the laminate precursor. The eight reinforcing fiber base materials sequentially laminated such that the alignment direction of the carbon fiber yarn was 45°/0°/−45°/90°/90°/−45°/0°/45° all have an equal width of 0.55 mm, and a length of 6.00 m, 5.99 m, 5.98 m, 5.97 m, 5.96 m, 5.95 m, 5.94 m, and 5.93 m. All the reinforcing fiber base materials were laminated with one end in the longitudinal direction thereof aligned. As a result, a slope shape 33 (called ply drop) formed at one end of the laminate precursor, as shown in the cross-sectional view of FIG. 8.

Subsequently, the partial adhesion of the laminate precursor was performed similar to example 1 using the laminate manufacturing device same as example 1 to manufacture a laminate.

As a result, it was confirmed that the inter-layers of carbon fiber base materials were satisfactorily partially adhered at both the thick area 31 and the thin area 32 of the laminate.

The forming test was further conducted to manufacture the pre-form and the outer appearance of the pre-form was examined, similar to example 1, and it was confirmed as a result that wrinkles and the like were not generated and the partially adhered laminate having a step-shape exhibits satisfactory formability.

Comparative Example 1

<Adhesion of Entire Surface of Laminate Precursor by Plate>

A total of 12 plate tools made of aluminum having a length of 500 mm and a width of 600 mm were prepared for a length of 6 m.

Similar to example 1, the laminate precursor was prepared, the laminate precursor was placed on a surface plate, twelve plate tools were arrayed in the longitudinal direction of the laminate on the laminate precursor, and the laminate precursor as well as the plate tools arranged on the laminate precursor were both covered and sealed with a bag film. Subsequently, the sealed interior was vacuumed to pressurize the laminate precursor by the atmospheric pressure through the plate tools.

The surface plate, the laminate precursor, and the plate tools were arranged in a hot-air oven while the laminate precursor is kept pressurized by the plate tools, the oven was heated to heat and pressurize the laminate at a temperature of 70° C. and at a holding time of five minutes, and then the adhesion of the entire surface of the inter-layers of the laminate precursor was completed.

About four hours were required from when the laminate precursor was placed on the surface plate until the adhesion of the entire surface of the inter-layers of the laminate precursor was completed.

<Forming Test of Laminate Adhered Over Entire Surface by Plate>

The manufactured laminate was formed to the forming die similar to example 1 to manufacture the pre-form.

As a result of examining the outer appearance of the pre-form, it was confirmed that significant wrinkles generated at the four corners of the pre-form and the laminate having the inter-layers adhered over the entire surface exhibits insufficient formability.

Comparative Example 2

<Partial Adhesion of Laminate Precursor by Pressing Tool>

A total of 12 pressing tools where the pressing pins used in example 1 were arrayed in the longitudinal direction and the width direction of the pressing plate on the pressing plate made of aluminum having a length of 500 mm and a width of 600 mm such that the distance between the adjacent pressing pin distal ends was 15 mm and where the pressing pins were welded and integrated to the pressing plate were prepared for a length of 6 m.

Similar to example 1, the laminate precursor was prepared, the laminate precursor was placed on the surface plate, twelve pressing tools were further arrayed in the longitudinal direction of the laminate precursor on the laminate precursor, and a weight was placed on each pressing tool thereby pressurize the laminate by the pressing tool, where the pressing pin distal end of each pressing pin could pressurize the pressurizing area of the laminate precursor at 0.1 N/mm$^2$.

The surface plate, the laminate precursor, and the pressing tool were arranged in a hot-air oven while the laminate precursor is kept pressurized by the pressing tool, the oven was heated to heat and pressurize the laminate at a temperature of 70° C. and at a holding time of five minutes, and then partial adhesion was completed.

About four hours were required from when the laminate precursor was placed on the surface plate until the partial adhesion of the laminate precursor was completed.

Comparative Example 3

The laminate precursor was prepared similarly to example 2, and partial adhesion of the laminate precursor was performed similarly to comparative example 2 to manufacture the laminate.

As a result, it was confirmed that the thick area 31 of the laminate was satisfactorily adhered, but the thin area 32 had a non-adhered range.

When trying to convey the laminate to the forming die to conduct the forming test similar to example 1, the delamination from the non-adhered range of the thin area 32 of the laminate advanced and the non-adhered range spread to a wider range, and thus conveyance was difficult. Furthermore, as a result of manufacturing the pre-form by performing the forming test similar to example 1 and resulting the outer appearance of the pre-form, it was confirmed that disturbance generated in the alignment angle of the carbon fiber yarn configuring the carbon fiber base material at the position corresponding to the area where the adhesion of the laminate was delaminated.

The invention claimed is:

1. A manufacturing device of a laminate comprising an adhesion device for partially adhering and integrating inter-layers of a laminate precursor in which two or more reinforcing fiber base materials having a resin material on a surface are laminated by the resin material to obtain a laminate, the adhesion device including a pressing tool and a plate tool arranged facing each other,
- the pressing tool including a pressing plate and a plurality of pressing pins disposed at the pressing plate,
- at least one of the pressing tool and the plate tool having a raising and lowering function,
- at least one of the pressing tool and the plate tool having a heating function, and
- a distance between a plate tool side distal end of each pressing pin and the pressing plate at which the plurality of pressing pins is disposed being individually variable.

2. The manufacturing device of the laminate according to claim 1, wherein the pressing pin is attached to the pressing plate by way of a spring and is movable by compressing the spring in a longitudinal direction of the pressing pin.

3. The manufacturing device of the laminate according to claim 1, wherein a distance between the plate tool side distal end of the pressing pin and the pressing plate is variable by hydrostatic pressure.

4. The manufacturing device of the laminate according to claim 1, wherein the pressing pin has a circular shape at the plate tool side distal end.

5. The manufacturing device of the laminate according to claim 1, wherein a tube for heating medium flow path is installed on at least one of the pressing tool and the plate tool having the heating function.

6. The manufacturing device of the laminate according to claim 1, wherein an insulating material is attached to a position of sandwiching at least one of the pressing tool and the plate tool having the heating function with the laminate precursor.

7. The manufacturing device of the laminate according to claim 1, further including a movement device for moving the laminate, the movement device including a means for conveying the laminate out from the adhesion device by moving the laminate parallel in a longitudinal direction of the laminate while being sandwiched and gripped from above and below in a thickness direction of the laminate, and supplying a laminate precursor different from the laminate precursor used for the conveyed laminate to the adhesion device.

8. The manufacturing device of the laminate according to claim 7, wherein the adhesion device and the movement device are driven by an air cylinder.

9. A manufacturing method of a laminate for partially adhering and integrating inter-layers of a laminate precursor in which two or more reinforcing fiber base materials having a resin material on a surface are laminated by the resin material through:
- (a) an arrangement step of arranging the laminate precursor between a plate tool and a pressing tool, where the pressing tool includes a pressing plate and a plurality of pressing pins disposed at the pressing plate and is configured such that a distance between a plate tool side distal end of each pressing pin and the pressing plate at which the plurality of pressing pins is disposed is individually variable; and
- (b) a pressurizing and heating step of lowering the pressing tool and/or raising the plate tool, sandwiching the laminate precursor between the pressing tool and the plate tool, partially pressurizing the laminate precursor with the pressing pins, and heating at least the pressurized location of the laminate precursor.

10. The manufacturing method of the laminate according to claim 9, wherein in the step (a), the laminate precursor is arranged between the plate tool and the pressing tool in which the pressing pin is attached to the pressing plate by way of a spring, and in the step (b), a length of compressing the spring and the pressure of pressurizing the laminate precursor with the pressing pin are controlled by lowering the pressing tool and/or raising the plate tool.

11. The manufacturing method of the laminate according to claim 9, wherein in the step (a), the laminate precursor is arranged between the plate tool and the pressing tool in which a distance between a plate tool side distal end of the pressing pin and the pressing plate is variable by hydrostatic pressure, and in the step (b), the hydrostatic pressure and a pressure of pressurizing the laminate precursor with the pressing pin are controlled by lowering the pressing tool and/or raising the plate tool.

12. The manufacturing device of the laminate according to claim 1, wherein the laminate precursor has thickness varying due to the lamination number change.

13. The manufacturing method of the laminate according to claim 9, wherein the laminate precursor has thickness varying due to the lamination number change.

* * * * *